Patented Sept. 8, 1925.

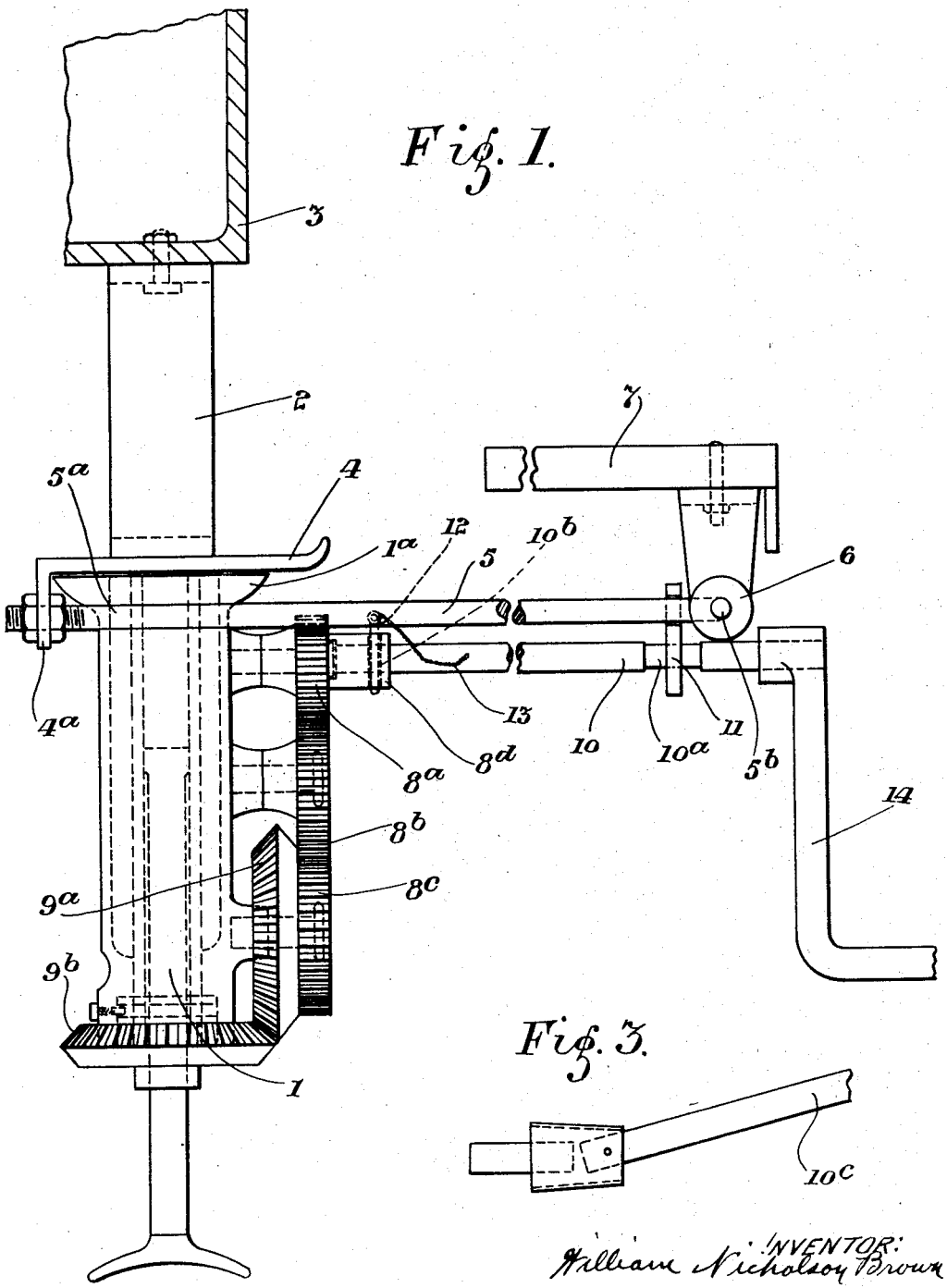

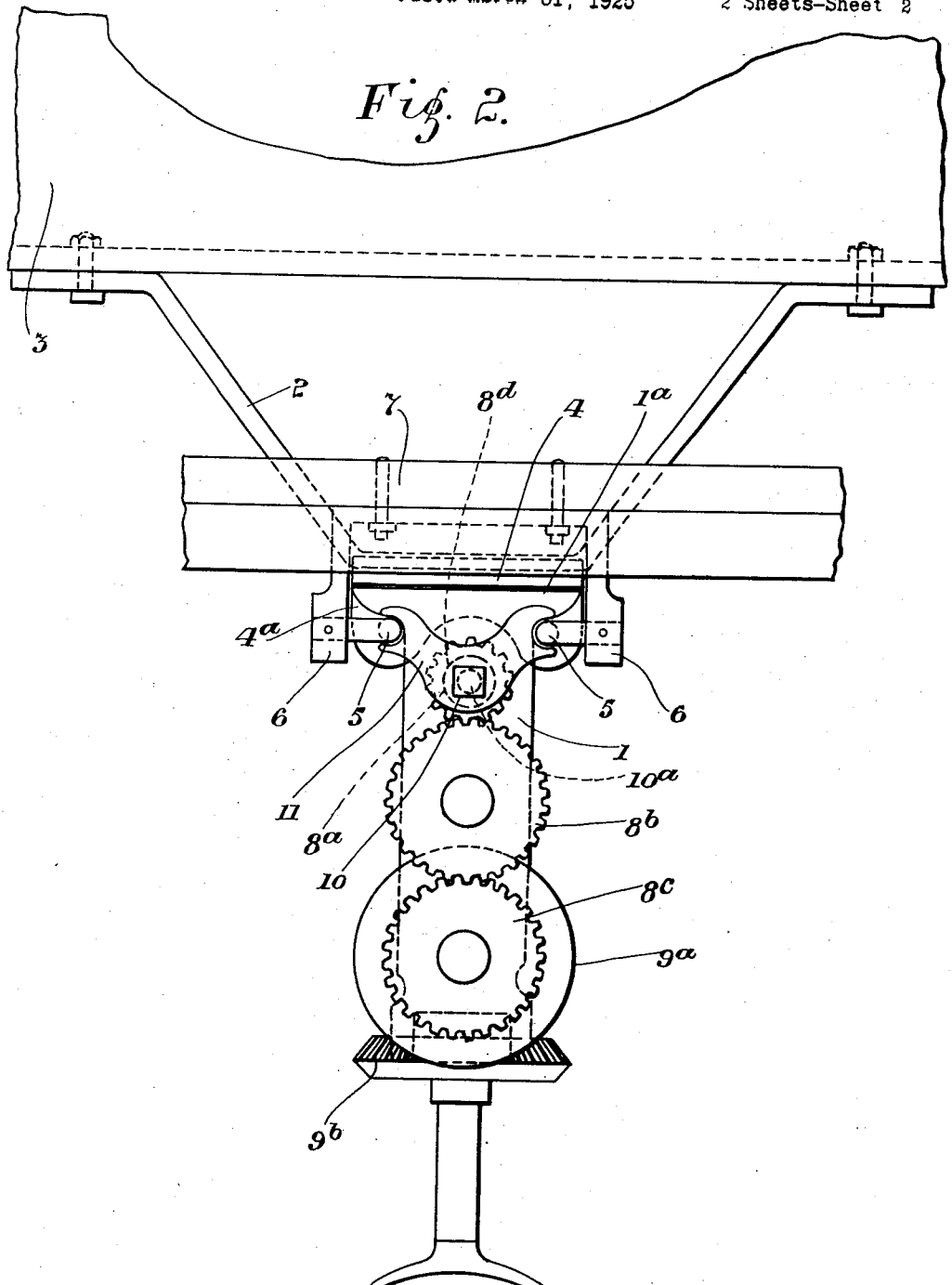

1,553,065

UNITED STATES PATENT OFFICE.

WILLIAM NICHOLSON BROWN, OF LARNE, IRELAND.

JACK FOR MOTOR VEHICLES.

Application filed March 31, 1925. Serial No. 19,598.

*To all whom it may concern:*

Be it known that I, WILLIAM NICHOLSON BROWN, of Lisnamoyle, Larne, county Antrim, Ireland, have invented certain new and useful Improvements Relating to Jacks for Motor Vehicles, of which the following is a specification.

This invention relates to jacks for motor vehicles, its object being to provide improvements therein.

According to this invention means are provided for removably supporting a lifting jack in its operative position at the side of a vehicle below the chassis frame for the purpose of enabling one side of the car, or vehicle to be lifted by the jack, using the wheels at the opposite side as supports. The means provided for detachably holding a lifting jack in position for the raising of the one side or the other of a motor car comprises suitably shaped brackets and rails arranged at the under side of the running board of the car, the head or top of the lifting jack being suitably shaped or otherwise adapted to be engaged by the supporting rails which, preferably, extend from the outer edge of the running board, inwardly, sufficiently far to permit of the jack being inserted and supported by them in a suitable position to bring the top of the jack directly below a suitable portion of the chassis frame and in order to reduce the amount of downward and upward movement of the jack, I would, preferably, provide a distance piece, or distance member, or members, depending downwardly from the chassis frame to the level of the top of the jack when it is in position below the chassis frame as described. I would also, preferably, provide such depending member, or members, with a portion adapted to form a stopper to limit the inward movement of the head of the jack and to form a guide for the proper positioning of the jack. I would also preferably provide a suitable bearing with a hinged or otherwise removable top portion adapted to receive a cylindrical portion of an operating shaft, or spindle, which is at its inner end connected with the operating wheels, or operating gear, or operating means of the jack, and at its outer end is adapted to receive the usual operating handle which may be of the rotating type, or which may be of the oscillating type with ratchet means for effecting turning movement of the operating spindle in opposite directions as desired. The operating spindle would, preferably, be of square section except the portion which engages in the bearing, or bearings if more than one should be provided, and the operating spindle may also, if desired, be provided with a projection adapted when required, to engage with the body of the jack and serve as a means for moving the jack outwards from its operative position to the outer end of the supporting rails so that it can be readily removed therefrom. Instead of the jack being operated through the medium of the spindle and handle as described, it may be operated by means of the well known long and angularly arranged operating spindle usual for the ordinary type of jack which is applied below the axle of a motor car.

The invention has been so far described with regard to screw and rack and pinion jacks, but it would be equally applicable to hydraulic jacks. The supporting rails would of course be provided at both sides of the vehicle and a single jack would be sufficient for use at either side of the vehicle as required.

The invention will now be described with reference to the accompanying drawings whereon, by way of illustration, or example only, the invention is shown applied to a motor car chassis and showing the jack supporting means supporting a jack of the screw type.

Fig. 1 is an elevation showing the relative positions of the chassis frame, the running board or foot board of the car and the jack supporting device, and also showing a screw jack in position below the chassis frame.

Fig. 2 is an elevation looking at right angles to Fig. 1 and looking towards the edge of the running board of the car.

Fig. 3 shows a modification of the manner of connecting the operating spindle with the jack.

Referring to the drawings:—

In the example shown in the drawings, the means provided for removably supporting the screw lifting jack 1 in position for the raising of one side of the motor car comprises a distance piece, or distance member 2 depending from the chassis side frame or side beam 3 and to the bottom of the depending distance piece, or member 2 is secured a jack positioning member and head plate 4 which has a portion 4ª with holes therein adapted to receive the one ends 5ᵃ of two rods 5 whose other ends 5ᵇ are supported in a double bracket 6 in such manner that there is no obstruction to the passage of any member between the rods 5 from the outer ends 5ᵇ thereof to the inner ends 5ᵃ. The bracket 6 is shown secured to the outer edge of the foot board, or running board 7 of the car. The jack 1 is supported by and is slidable on the rods 5 and the head 1ᵃ of the jack is so made that it slides readily under the head piece 4 below the distance piece 2. In the example shown the jack 1 is operated through spur gearing 8ᵃ, 8ᵇ and 8ᶜ and bevel gears 9ᵃ and 9ᵇ. The spur wheel 8ᵃ is made with a boss, or extension 8ᵈ adapted to receive the squared end of a spindle 10 which is supported at its front end in a bearing 11. The spindle 10 is of square section except at the portion 10ᵃ through the bearing 11. The bearing member 11 is made as shown clearly at Fig. 2 so that it can be readily slid into position on the rods 5 which support it, and from which it is removable with the jack when the jack is removed. A hole 10ᵇ is provided in the inner end of the spindle 10 and corresponding holes are provided in the extension or boss 8ᵈ on the spur wheel 8ᵃ so that a pin 12 secured by a chain 13 to the rod 10 can be inserted in the said holes for the purpose of temporarily securing the inner end of the spindle 10 to the jack operating gear. This arrangement also permits of the spindle 10 being used for the proper placing of the jack 1 in position below the head piece 4 and also facilitates its removal therefrom when required. At the outer end of the spindle 10 a turning handle 14 is shown.
This handle 14 may be a plain handle as shown or it may be of any other type, for example it may be of the oscillating type with ratchet means for effecting turning movement of the operating spindle 10 in opposite directions as desired. If desired the operating means for the jack may be reversed from the position shown, the extension or boss 8ᵈ being provided on the lowest wheel of the gear and a universal connection such as shown at Fig. 3 provided so that the jack may be operated by means of the well known long and angularly arranged operating spindle such as 10ᶜ and which is usual for ordinary types of motor car lifting jacks.

It is to be understood that whilst the invention is shown in the drawings with a screw jack it would be equally applicable to hydraulic jacks, the essential feature of the invention being the means for inserting and supporting the jack in its operative position at the side of the vehicle below the chassis frame.

It is also to be understood of course that the jack inserting and supporting means as described would be provided at both sides of a vehicle and a single jack will be sufficient for use at either side of the vehicle as required.

What I claim as my invention and desire to secure by Letters Patent is:—

1. The combination with a lifting jack and operating mechanism therefor of means for temporarily attaching the jack to the chassis of the vehicle, said means comprising rails, on which the jack is slidably mounted, disposed transversely beneath the vehicle; a bracket, fitted to the side member of the chassis, supporting one end of the said rails; and a bracket, fitted to the foot-board of the vehicle, supporting the other end of the said rails.

2. The combination with a lifting jack and operating mechanism therefor of means for temporarily attaching the jack to the chassis of the vehicle, said means comprising rails, on which the jack is slidably mounted, disposed transversely beneath the vehicle; a distance piece secured to the side member of the chassis; a broad plate fitted to the underside of the said distance piece; a flange, formed on the said plate, adapted to carry one end of the rails supporting the jack, and a bracket fitted to the foot board of the vehicle, supporting the other end of said rails.

3. The combination with a lifting jack of a collar formed on the head of the casing of the jack; rails slidably supporting the said jacks by engagement under the said collar; a bracket, fitted to the side member of the chassis, supporting one end of the said rails; a bracket, fitted to the footboard of the vehicle, supporting the other end of the said rails; and operating mechanism for the said jack.

4. The combination with a lifting jack of a collar formed on the head of the casing of the jack; rails slidably supporting the said jack by engagement under the said collar; a distance piece secured to the side member of the chassis; a broad plate fitted to the underside of the said distance piece; a flange, formed on the said plate, adapted to carry one end of the rails supporting the jack, a bracket fitted to the foot of the board of the vehicle, supported to the other end of the said rails; a spindle rotatable by means outwith the footboard of the vehicle; a bracket, carrying the spindle, slidably borne by the said rails; and transmission gear adapted to be engaged by the spindle for operating the jack.

5. The combination with a lifting jack of a collar formed on the head of the casing of the jack; rails slidably supporting the said jack by engagement under the said collar; a distance piece secured to the side member of the chassis; a broad plate fitted to the underside of the said distance piece; a flange, formed on the said plate, adapted to carry one end of the rails supporting the jack, a bracket fitted to the foot of the board of the vehicle, supported to the other end of the said rails; a spindle rotatable by means outwith the foot-board of the vehicle; a bracket, carrying the spindle, slidably borne by the said rails; transmission gear adapted to be engaged by the spindle for operating the jack; and means for holding the spindle in connection with the said transmission gear.

In testimony whereof I affix my signature.

WILLIAM NICHOLSON BROWN.